United States Patent
Ewing et al.

(10) Patent No.: US 12,451,113 B2
(45) Date of Patent: Oct. 21, 2025

(54) DEVICE AND METHOD FOR ACTIVE NOISE CONTROL

(71) Applicant: Invisio Communications Ltd, Watford (GB)

(72) Inventors: James C. Ewing, Harrow (GB); James Griffin, Harrow (GB); Donald Stewart Murray, Harrow (GB)

(73) Assignee: INVISIO Communications Ltd, Watford (GB)

(*) Notice: Subject to any disclaimer, the term of this patent is extended or adjusted under 35 U.S.C. 154(b) by 264 days.

(21) Appl. No.: 18/160,528

(22) Filed: Jan. 27, 2023

(65) Prior Publication Data

US 2023/0245639 A1    Aug. 3, 2023

(30) Foreign Application Priority Data

Jan. 28, 2022   (GB) .................................. 2201146

(51) Int. Cl.
*G10K 11/178*   (2006.01)
*H03F 3/183*   (2006.01)
*H04R 1/10*   (2006.01)

(52) U.S. Cl.
CPC .. *G10K 11/17823* (2018.01); *G10K 11/17873* (2018.01); *H04R 1/1041* (2013.01);
(Continued)

(58) Field of Classification Search
CPC ....... G10K 11/17823; G10K 11/17873; G10K 2210/1081; G10K 2210/12821; G10K 2210/3011; G10K 2210/3027; G10K 2210/3028; G10K 2210/3224; H04R 1/1041; H04R 1/1083; H04R 2460/01; H03F 3/183; H03F 2200/03
(Continued)

(56) References Cited

U.S. PATENT DOCUMENTS 6,278,786 B1   8/2001   McIntosh
9,049,513 B2   6/2015   Yamkovoy
(Continued)

FOREIGN PATENT DOCUMENTS

CN   110521215 A   11/2019
EP   3456299 A1   3/2019
WO   2022108777 A1   5/2022

OTHER PUBLICATIONS

Search Report for United Kingdom Patent Application No. GB2201146.4, mailed May 4, 2022, 4 pages.
(Continued)

*Primary Examiner* — Vivian C Chin
*Assistant Examiner* — Con P Tran
(74) *Attorney, Agent, or Firm* — Withrow + Terranova, PLLC; Vincent K. Gustafson

(57) ABSTRACT

The invention provides an active noise reduction system which may be self-contained within a headset of the system, wherein circuitry within the system applies an active noise reduction profile to a signal to the speakers in the headset, to provide active noise reduction to the user of the headset, the system being arranged to receive power both from a power supply external to the system and from a battery of the system and to automatically modify the active noise reduction applied, in dependence on whether or not the system is connected to an external power supply.

14 Claims, 2 Drawing Sheets

(52) U.S. Cl.
CPC ... *H04R 1/1083* (2013.01); *G10K 2210/1081* (2013.01); *G10K 2210/12821* (2013.01); *G10K 2210/3011* (2013.01); *G10K 2210/3027* (2013.01); *G10K 2210/3028* (2013.01); *G10K 2210/3224* (2013.01); *H03F 3/183* (2013.01); *H03F 2200/03* (2013.01); *H04R 2460/01* (2013.01)

(58) Field of Classification Search
USPC ......... 381/71.2, 71.3, 71.4, 71.5, 71.7, 71.8, 381/71.9, 71.11, 71.12, 71.13, 71.14, 91, 381/122, 111, 98
See application file for complete search history.

(56) References Cited

U.S. PATENT DOCUMENTS

| | | | |
|---|---|---|---|
| 9,620,101 B1 | 4/2017 | Thandri et al. | |
| 2007/0154046 A1* | 7/2007 | Mishan | H04R 1/1083 381/370 |
| 2014/0079236 A1 | 3/2014 | Yamkovoy | |
| 2022/0159367 A1* | 5/2022 | Yamkovoy | G10K 11/17821 |

OTHER PUBLICATIONS

Office Action for Canadian Patent Application No. 3187451, mailed Jun. 27, 2024, 4 pages.
Extended European Search Report for European Patent Application No. 22217419.5, mailed May 26, 2023, 12 pages.
Examination Report for European Patent Application No. 22217419.5, mailed Jun. 12, 2024, 11 pages.
Examination Report for United Kingdom Patent Application No. GB2201146.4, mailed Nov. 21, 2023, 4 pages.
Examination Report for Indian Patent Application No. 202344004388, mailed Jan. 23, 2024, 6 pages.
First Office Action for Chinese Patent Application No. 202310042613.0, mailed Jun. 25, 2025, 17 pages.
Intention to Grant for European Patent Application No. 22217419.5, mailed May 20, 2025, 7 pages.

* cited by examiner

DEVICE AND METHOD FOR ACTIVE NOISE CONTROL

CROSS-REFERENCE TO RELATED APPLICATION(S)

This application claims priority to United Kingdom Patent Application No. 2201146.4 filed on Jan. 28, 2022, wherein the entire contents of the foregoing application are hereby incorporated by reference herein.

TECHNICAL FIELD

The present invention relates to an active noise reduction system for a headset and to a method of active noise reduction for a headset and particularly, but not exclusively, to such a system and method suitable for a user to use while both aboard a vehicle and when subsequently dismounted from that vehicle.

BACKGROUND

Acoustic noise, within the confines of a vehicle, is a combination of sounds from a variety of sources such as engine noise, wind noise, noise from the contact of wheels/tracks with the surface, and mechanical vibration. Particularly in the case of tracked vehicles, the acoustic noise level within the vehicle can be considerable and requires the use of hearing protection devices in order to prevent Noise Induced Hearing Loss (NIHL).

Such hearing protection devices normally comprise either an in-ear or over-the-ear headset offering passive noise attenuation in the form of a cushion forming the seal between the headset and the ear/head, augmented by an active noise reduction (ANR) mechanism. For the ANR mechanism, the signal from a noise detection microphone is injected into the headset and electronically subtracted from the signal being fed to the speaker in the headset, by either analogue or digital means. The background noise received at the wearer's ear is thus therefore cancelled out, thus reducing the wearer's noise exposure.

The noise within the confines of a vehicle is at the low end of the audible frequency spectrum, typically less than 400 Hz. Vehicular mounted ANR headsets are therefore optimised to perform best at these frequencies and the reduction in background noise received at the wearer's ear in that frequency range would normally be expected to be over 10 dB less than with an equivalent headset with passive attenuation alone.

When worn within the vehicle, the headset does not normally solely act as a hearing protection device, but it may also be connected to the intercom within the vehicle, to serve as a communications device. In this scenario, the power to the active noise reduction circuit within the headset will be provided from the vehicle via a connection cable. This is termed vehicle line power.

The noise outside a vehicle is normally less than the noise encountered within a vehicle, or on a moving vehicle, and thus when exiting or dismounting from a vehicle, a user will often first remove the headset, or alternatively remove the communication cable from the headset, in which case they may continue to benefit from the passive noise reduction provided by the headset.

SUMMARY

According to a first aspect of the present invention there is provided an active noise reduction system arranged to be worn and/or carried by a user, the system comprising: a headset arranged to provide passive noise reduction; at least one noise detection microphone arranged to detect noise external to the headset; at least one speaker for creating sound in the headset; a battery; and an active noise reduction circuit arranged to receive a signal from the at least one noise detection microphone and to apply an active noise reduction profile to the signal to generate active noise reduction at the at least one speaker, wherein the system is arranged to: both receive power from a supply external to the system and from the battery of the system; to detect when the system is connected to an external power supply; and to automatically modify the active noise reduction in dependence on whether or not the system is connected to an external power supply.

An active noise reduction system in accordance with the present invention may be arranged to provide active noise reduction at a first level, when connected to the external power supply, and at a second level, when not connected to an external power supply. This may be advantageous, for although noise levels will generally be less outside the vehicle than within the vehicle, and particularly within the vehicle when moving, outside of the vehicle there could still be significantly high levels of ambient noise, for example from the engines of adjacent vehicles, aircraft, mechanical handling equipment and the like. The present invention thus enables a second level of active noise reduction to occur, typically on leaving a vehicle, which may be automatically triggered by disconnection of the external (vehicle) power supply from the system, triggering the modification of the applied active noise reduction. This modification may result in a reduced level of active noise reduction, relative to that available when connected to the external (vehicle) power supply. This lower level of active noise reduction may however be acceptable when no longer aboard a vehicle and this will provide a significant saving on the power consumed by the system. This is particularly beneficial, for at such times the active noise reduction will be being powered by the battery of the system and it will significantly extend the life of that battery.

Preferably, the system is arranged to apply a first active noise reduction profile when connected to an external power supply and to apply a second active noise reduction profile, different to the first active noise reduction profile, when not connected to an external power supply.

The above feature is advantageous because the noise levels encountered when dismounted from a vehicle are likely to be significantly different to those encountered aboard the vehicle. Hence, it is advantageous to use a second active noise reduction profile, when operating on battery power, which profile is customised to the noise levels, at various frequencies, that will likely be encountered when dismounted from the vehicle. This second active noise reduction profile may then be different to the first active noise reduction profile, used when connected to an external (vehicle) power supply, where the wearer is likely to be onboard a vehicle. Here the first active noise reduction profile is then preferably customised to the noise levels at the various frequencies that are likely to be encountered within the vehicle.

The first active noise reduction profile may be biased more to reduction of low frequency noise (encountered within a vehicle) than the second active noise reduction profile, which may be particularly advantageous for a noise reduction profile targeted at low frequency noise, when connected to the external power supply, will normally tend to consume power at a greater rate than a noise reduction profile, not directed specifically to the reduction of low frequency noise.

The active noise reduction circuit may comprise an active noise reduction filter element, which allows non-filtered portions of the frequency spectrum to pass through without modification and wherein the filter settings applied are different, depending on whether or not an external power supply is connected. In this manner, the connection of the external power supply may automatically alter the filter characteristics of the active noise reduction system. For example, the filter characteristics may be selected to avoid active noise reduction at frequencies associated with human speech, when disconnected from the external power supply, but to permit active noise reduction of those same frequencies when connected to the external power supply. This is because, when connected to the external power supply, the headset will likely be connected to a vehicle intercom, where noise cancellation at frequencies associated with human speech will not be problematic, as speech will not be received from external of the headset, but only via the intercom. In such a scenario the external power supply may be a vehicle line power supply with a single connection cable then extending between the headset and the vehicle, providing both a connection to vehicle intercom and to the vehicle line power.

The active noise reduction system of the invention may comprise at least one audio amplifier associated with the headset, for amplifying the active noise reduction signal received from the active noise reduction circuit, wherein the system comprises means for switching the voltage supplied to the at least one amplifier in dependence on whether or not the system is connected to an external power supply. Thus the at least one amplifier may then be powered at a higher voltage when the system is connected to an external power supply, (and thus the active noise reduction signal may then be amplified to a greater extent), than when the system is disconnected from an external power supply.

Thus, in addition to modifying the active noise profile and possibly the filter settings, or alternatively to altering the active noise reduction profile and possibly filter settings, the detected connection and disconnection of the external power supply may be used to control the voltage of the power supply to the amplifier, or amplifiers, of the headset, with a lower voltage being provided when disconnection from the external power supply.

Powering the amplifiers at a lower voltage will reduce the performance of the active-noise reduction characteristics of the headset, but this may not significantly impact on the performance, as perceived by a user, for when disconnected from the external power supply the system will likely be subjected to lower levels of external noise which may still be adequately reduced, even when the amplifiers are connected to the lower voltage supply. However, reducing supply voltage will automatically significantly reduce the power consumed by the amplifiers.

In one embodiment, the active noise reduction system may further comprise a first power supply circuit arranged to be connected to an external power supply and to provide power at both a first voltage and at a second voltage lower than the first voltage; a second power supply circuit connected, or arranged to be connected, to the battery and to provide power at, or approximately at, both the second voltage and a third voltage higher than the second voltage, but not higher than the first voltage; one or more switching components arranged to provide power at the second voltage to the active noise reduction circuit from the first power supply when connected to an external power supply and from the second power supply when disconnected from the external power supply; and one or more switching components arranged to provide power to the at least one amplifier at the first voltage from the first power supply circuit when connected to an external power supply and at the third voltage from the second power supply circuit, when disconnected from the external power supply.

The above arrangement permits the same voltage supply to be provided to the active noise reduction circuit regardless of whether the system is connected to, or disconnected from, an external power supply whilst automatically reducing the voltage of the supply to the one or more amplifiers, when the system is disconnected from an external power supply.

Preferably, the entire active noise reduction system, including the battery, is comprised within the headset, so that a user, when leaving a vehicle, may simply disconnect a connection cable to the vehicle, disconnecting the headset from vehicle line power and possibly simultaneously disconnecting the headset from the vehicle intercom, permitting the user to then leave the vehicle. However, they will then continue to benefit from active noise reduction using the battery within the headset, which may typically be a simple "AA" battery, these being relatively small, low weight and usually readily available for replacement, but which may be adequate to provide a lower level of active noise reduction, when the user is away from the vehicle.

According to a second embodiment of the present invention, there is provided a method of active noise reduction for a headset having both an internal battery and a connection to an external power supply, the method comprising detecting noise external to the headset and applying an active noise reduction profile to an external noise signal and using this within the headset to provide active noise reduction for a wearer of the headset, the method comprising detecting when the headset is connected to an external power supply and automatically modifying the active noise reduction in dependence on whether or not the system is connected to an external power supply.

It will be appreciated that the above method provides similar advantages to those discussed above with reference to the first aspect of the present invention.

BRIEF DESCRIPTION OF DRAWINGS

One embodiment of the present invention will now be described, by way of example only, with reference to the accompanying drawings, of which.

DETAILED DESCRIPTION

Figure 1:
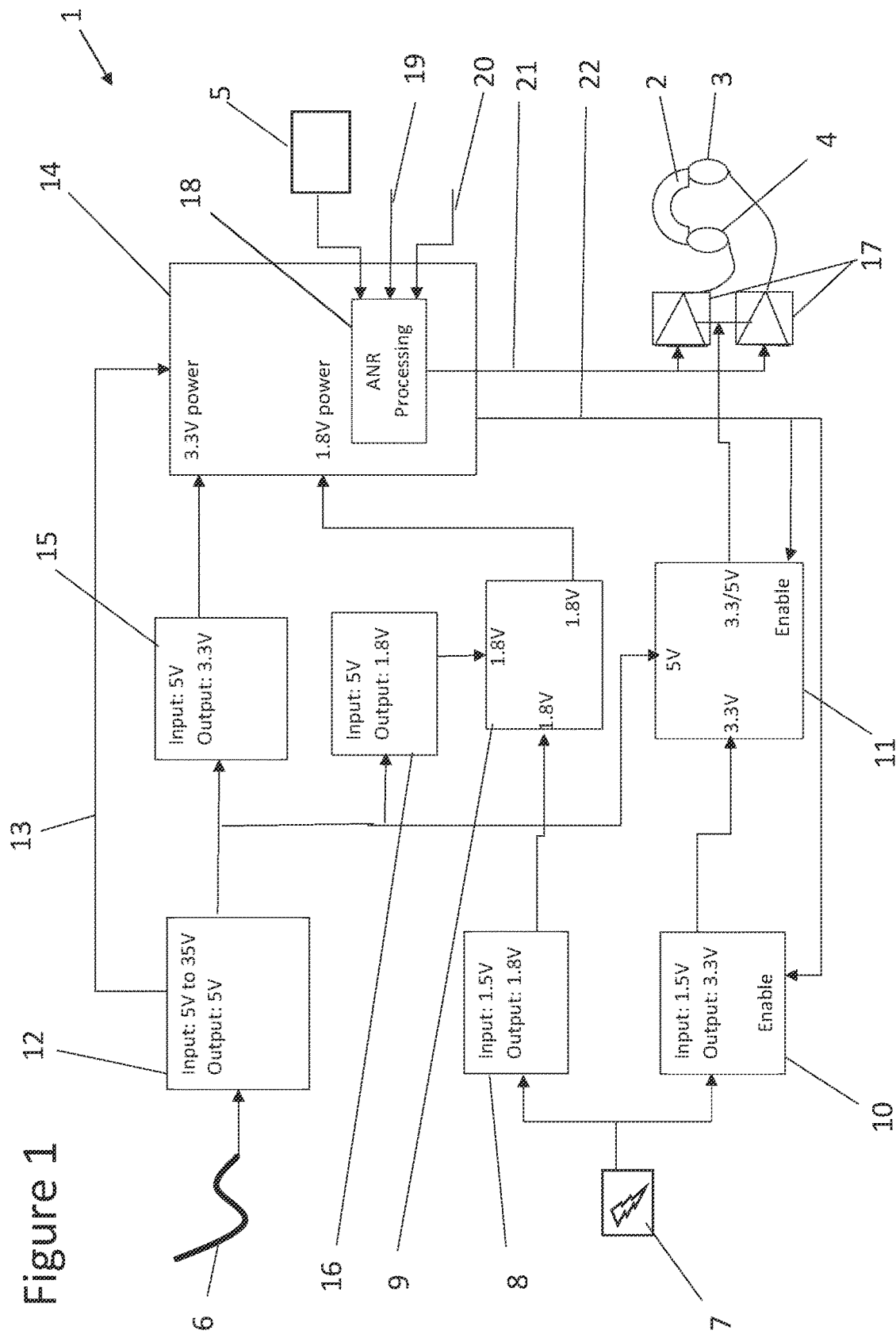
FIG. 1 is schematic diagram illustrating the components of an active noise reduction system in accordance with the present invention.

Referring now to FIG. 1, this schematically illustrates the components of an active noise reduction system in accordance with the present invention and this system is indicated generally as 1. The system 1 comprises a headset 2 having left and right earshells 3 and 4, each of which will have a cushion forming a seal between the earshell and the head of a user, which cushion will provide passive noise attenuation. Each earshell will also contain a speaker, not shown, and one or each earshell 3, 4 may house behind a protective foam insert, inside an ear-cushion, a noise detection microphone 5.

For the purposes of illustrating the components of the system, the noise detection microphone 5 and the other components of the system 1 are shown in FIG. 1 to be separate to the headset 2. However, with the exception of the connection cable 6, these are housed within the headset 2 and are thus all arranged to be carried by the user, for so long as the user is wearing the headset.

The system 1 of FIG. 1, receives power from either an internal battery 7, or via a connection cable 6 connected to an external power supply. The connection cable 6 may, for example, be connected to a socket within a vehicle, providing vehicle line power. This same connection cable 6 may also be used connect the system 1 and the headset 2 to an intercom within the vehicle, so that the headset 2 may also serve as a communications device.

The battery 7 may be a 1.5v AA battery, which is small enough to be incorporated within the headset 2 and which is normally fairly readily available, to enable a wearer of the headset to either carry a spare or to source a replacement locally, should this be necessary. However, this limits the total power available from such a small battery.

As shown in FIG. 1, the 1.5V supply, provided by the battery 7, is provided to both a first DC to DC converter 8, which provides a 1.8V output to a first input of a power switch 9, and to a second DC to DC converter 10, which provides a 3.3V output to an audio amplifier power switch 11.

The connection cable 6 may typically be connected at a first end to an external power supply having a voltage of between 5V and 35V. The connection cable 6, at its other end, is connected to the input of a third DC to DC converter 12, which provides a 5V output. The third DC to DC converter 12 also provides a signal, represented schematically by line 13, to active noise reduction circuitry 14, which signal indicates, to the active noise reduction circuitry 14, when the third DC to DC converter (and thus the system 1) is connected to an external power supply. However, this indication of a connection to an external power supply could equally be indicated by other means, for example the availability to the active noise reduction circuitry 14 of a 3.3V power supply, from the first low drop regulator 15.

As shown in FIG. 1, the 5V output of the third DC to DC converter 12 is connected to: a first low drop regulator 15, which in turn provides a 3.3V supply to the active noise reduction circuitry 14; a second low drop regulator 16, which in turn provides a 1.8V supply to the power switch 9; and to the audio amplifier power switch 11.

The active noise reduction circuitry 14 includes a microcontroller and digital signal processing function, for controlling the active noise reduction system and for providing digital signal processing in a conventional manner. The active noise reduction circuitry 14 is also shown, schematically, to comprise an active noise reduction processing circuit 18, but in practice this will normally be comprised in the overall noise reduction circuitry 14. The active noise reduction processing circuitry 18 receives an input from the noise detection microphone in addition to inputs from two other sources, represented by arrows 19 and 20 respectively.

The arrow 19 represents an audio input which could, for example, be provided via connection cable 6, when connected to a vehicle, wherein the audio input may then be an audio signal from the vehicle intercom.

The active noise reduction processing circuit 18 receives a second audio input, represented by arrow 20, which is an audio input derived from a USB connection. The USB derived audio input 20 may only be utilised when the system 1 is connected, via connection cable 6, to an external power supply, because in order to handle the USB derived audio signal, the active noise reduction circuitry 14 requires a 3.3v power supply. This is only available from the first low drop regulator 15 when the system 1 is connected to an external power supply.

The active noise reduction processing circuit 18 provides an output signal on line 21 to the audio amplifiers 17, where the signals are amplified by amplifiers 17, before being fed to the speakers within the earshells 3 and 4 of the headset 2.

Considering first the case where the system 1 is connected, by connection cable 6, to an external power supply, such as vehicle line power, here a 5V supply is received by each of the first and second low drop regulators 15 and 16 and by the audio amplifier power switch 11. Additionally, the active noise reduction circuitry 14 is made aware of the availability of the external power supply by the signal provided to it, schematically represented by the line 13.

When the connection cable 6 is connected to an external power supply, a 1.8V power supply is automatically received by the active noise reduction circuit 14 via the third DC to DC converter 12, the second low drop regulator 16 and the power switch 9, which in the presence of a 1.8V supply from the second low drop regulator 16 connects the low drop regulator 16 to the active noise reduction circuit 14. This is in preference to connecting the battery 7, via the first DC to DC converter 8 to the active noise reduction circuit 14, thus conserving battery power when the system is connected to an external power supply.

When powered up, the active noise reduction circuit 14, including the active noise reduction processing circuit 18, receives a signal from the noise detection microphone 5, which is processed to provide a signal electronically subtracted from the signal being fed to the speaker in the headset, via a signal on line 21 and the amplifiers 17, in order to cancel the noise that would otherwise be received by the user.

When the system 1 is connected to the external power supply, via connection cable 6, the audio amplifier power switch 11 defaults to a state where it connects the amplifiers 17 to the 5V power supply from the third DC to DC converter 12. This voltage supply is higher than would be received on battery power (see the discussion further below), and enables a higher noise cancellation signal to be provided and thus more active noise reduction than would be the case when the amplifiers are powered by a lower voltage supply.

Figure 2:
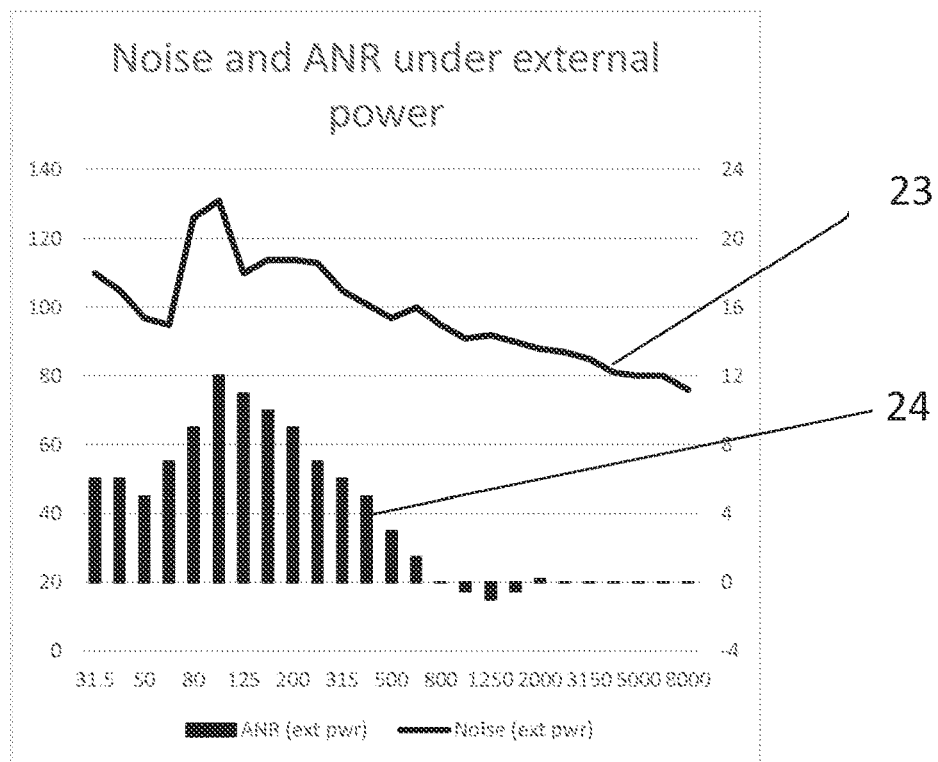
FIG. 2 is a graphical representation of noise levels which may typically be experienced within a vehicle and shows a first active noise reduction profile which may be used by the system of claim 1, when the system is connected to an external power supply.

When connected to the external power supply, the wearer of the headset 2 may be likely to be in a vehicle and, in the case of an operating tracked vehicle, a typical noise profile, of the noise received by the noise detection microphone 5, may be as indicated by the line 23 in FIG. 2. Here the peak noise value, as indicated by the left-hand vertical axis, may reach 130 dB. In anticipation of expected noise levels being of the magnitude represented by the line 23 of FIG. 2, the active noise reduction processing circuit has set, within its software, gain settings as per those represented by the vertical bars 24 of FIG. 2, at the respective frequencies indicated along the X axis. In addition, a filtering function is applied at frequencies above 800 Hz, above which the noise level is expected to be at acceptable levels and is not subjected to active noise reduction.

If a user should disconnect the connection cable 6, while the system is in use, for example when dismounting from a vehicle, or if the system 1 is switched on without being connected to an external power supply, then power from the battery 7 will be received by the active noise reduction circuit 14, by way of the first DC to DC converter 8 and the power switch 9, which in the absence of receiving power from the second low drop regulator 16 will default to connecting the first DC to DC converter 8 to the active noise reduction circuit 14. The active noise reduction circuit 14 will then determine that there is no signal on the line 13 and thus know that the system is running on battery power.

When a signal is then to be provided, via the amplifiers 17, to the speakers in the earshells 3 and 4, the active noise reduction circuit 14, aware that the system is powered by battery 7, will provide a signal on line 22, "enabling" the second DC to DC converter 10 and the audio amplifier power switch 11, to connect the 3.3V supply from the second DC to DC converter 10 to the amplifiers 17. In this manner, the second DC to DC converter 10 and the audio amplifier power switch 11 are energised only when the headset is generating audio, thus saving power at all other times and thus extending the lifetime of the battery 7.

In addition to the above, now powering the amplifiers at 3.3V, instead of at 5V, will approximately halve the power consumed by the amplifiers 17. As this is approximately half the power consumed by the system 1, this will improve battery lifetime by approximately twenty five percent, (compared with if the amplifiers 17 had been powered at 5V from the battery 7). Although this saving in power consumption, while the system is drawing power from the battery 7, will limit the ability of the amplifiers 17 to produce such high cancelling signals, compared to when powered from a 5V supply, this will normally be acceptable. This is because, when the user is remote from a vehicle, a typical noise profile may be as indicated by the line 25 in FIG. 3, where the noise now peaks at only about 100 dB (compared to 130 dB in the case of FIG. 2). For such lower noise values, sufficient active noise reduction may be achieved by the amplifiers 17, even when powered from a 3.3V supply.

Figure 3:
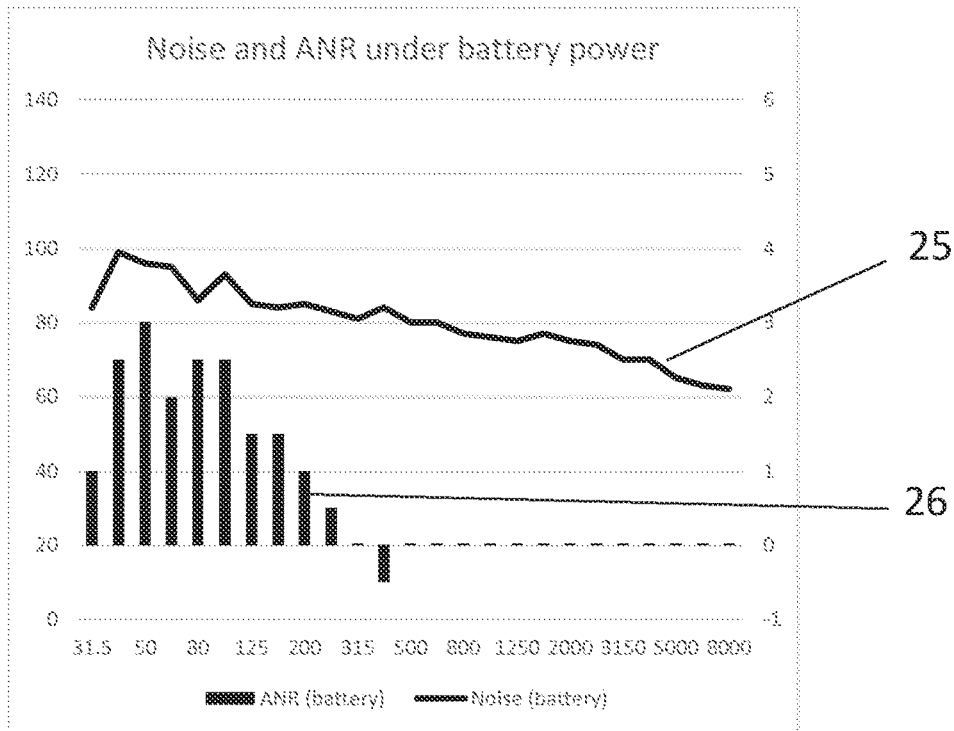
FIG. 3 is a graphical representation corresponding to that of FIG. 2, but shows the noise levels which may be typically experienced externally of a vehicle and the active-noise reduction profile that may be applied by the system of claim 1, when the system is disconnected from an external power supply.

When the system 1 is not connected to an external power supply, as stated above, the noise levels may be expected to be of the magnitude indicated by the line 25 in FIG. 3. Therefore, a second active noise reduction profile is stored in the active noise reduction circuit 14 and in response to failing to detect a signal on the line 13, indicating connection to an external power supply, the active noise reduction circuit 14 modifies the active-noise reduction profile applied by the active noise reduction processing circuit 18, to a have a profile now as represented by the bars 26 in FIG. 3. Furthermore, again a filtering function is applied at frequencies above a certain level, but here this is now applied to frequencies above 250 Hz, above which the noise level is expected to be at acceptable levels and is thus not subjected to active noise reduction. Thus a reduced frequency range is subject to active noise reduction, thus further reducing battery drain and extending the lifetime of the battery 7.

One embodiment of the present invention has been described by way of example only, with reference to the accompanying figures, but it will be appreciated that many modifications to such an embodiment and the method employed, may be made which fall within the scope of the appended claims. Particularly, it will be noted that when powered from the battery 7, the described system saves power both by modifying the active-noise reduction profile applied by the active-noise processing circuit 18, relative to that applied when the system 1 is connected to an external power supply, and in addition by reducing the voltage of the power supplied to the amplifiers 17. Both features reduce the drain on the battery and thus, although it is advantageous to employ both such features in a system, a system employing only either one of these features would also extend the battery life and would thus be beneficial. Thus, it is foreseen that the system 1, described above and illustrated with reference to the figures, could be modified to provide only one of the two above mentioned features.

The invention claimed is:

1. An active noise reduction system arranged to be worn and/or carried by a user, the system comprising:
   a headset arranged to provide passive noise reduction;
   at least one noise detection microphone arranged to detect noise external to the headset;
   at least one speaker for creating sound in the headset;
   a battery; and
   an active noise reduction circuit arranged to receive a signal from the at least one noise detection microphone and to apply active noise reduction to the signal to generate an active noise reduction output at the at least one speaker;
   wherein:
   the system is arranged to receive power both from an external power supply arranged external to the system and from the battery of the system;
   the system is arranged to detect when the system is connected to the external power supply;
   the system is arranged to automatically modify the applied active noise reduction in dependence on whether or not the system is connected to the external power supply; and
   the system further comprises at least one audio amplifier associated with the headset for amplifying the active noise reduction signal received from the active noise reduction circuit, and further comprises means for switching the voltage supplied to the at least one amplifier in dependence on whether or not the system is connected to the external power supply, such that the at least one amplifier is powered from a higher voltage supply when the system is connected to the external power supply, and thus greater active noise reduction may be attained, than when the system is disconnected from the external power supply.

2. The active noise reduction system of claim 1, wherein the system is arranged to apply a first active noise reduction profile when connected to the external power supply and arranged to apply a second active noise reduction profile, different from the first active noise reduction profile, when not connected to the external power supply.

3. The active noise reduction system of claim 2, wherein the first active noise reduction profile is customised for the active noise reduction output within a vehicle and the second active noise reduction profile is customised for the active noise reduction output when dismounted from the vehicle.

4. The active noise reduction system of claim 2, wherein the first active noise reduction profile is biased more to the reduction of low frequency noise than the second active noise reduction profile.

5. The active noise reduction system of claim 2, wherein the active noise reduction circuit comprises an active noise reduction filter element which allows non-filtered portions of the frequency spectrum to pass through without modification and wherein the filter settings applied are different depending on whether or not the external power supply is connected.

6. The active noise reduction system of claim 1, wherein the system is arranged to receive power from the external power supply at a voltage in excess of the voltage of the battery.

7. The active noise reduction system of claim 1, wherein the external power supply is vehicle line power.

8. The active noise reduction system of claim 7, wherein the system is arranged to be connected to a vehicle intercom by a connection cable and to receive the vehicle line power through the same connection cable.

9. The active noise reduction system of claim 1, further comprising:
   a first power supply circuit arranged to be connected to the external power supply and to provide power at both a first voltage and at a second voltage lower than the first voltage;
   a second power supply circuit connected, or arranged to be connected, to the battery and to provide power at, or approximately at, both the second voltage and a third voltage higher than the second voltage, but not higher than the first voltage;
   one or more first switching components arranged to provide power at the second voltage to the active noise reduction circuit from the first power supply circuit when connected to the external power supply and from the second power supply circuit when disconnected from the external power supply; and
   one or more second switching components arranged to provide power to the at least one amplifier at the first voltage from the first power supply circuit when connected to the external power supply and at the third voltage from the second power supply circuit when disconnected from the external power supply.

10. The active noise reduction system of claim 1, wherein the entire system, including the battery, is comprised within the headset.

11. A method of active noise reduction for a headset having both an internal battery and a connection to an external power supply, the method comprising:
    detecting noise external to the headset;
    applying active noise reduction to an external noise signal within the headset to provide an active noise reduction output for a wearer of the headset;
    detecting when the headset is connected to the external power supply and automatically modifying the application of the active noise reduction in dependence on whether or not the system is connected to the external power supply; and
    supplying power to an amplifier for a speaker of the headset at a higher supply voltage, when it is detected that the headset is connected to the external power supply, and at a lower supply voltage, when it is detected that the headset is not connected to the external power supply.

12. The method of claim 11, comprising applying a first noise reduction profile in response to detecting that the headset is connected to the external power supply and applying a second active noise reduction profile, different from the first active noise reduction profile, in response to detecting that the headset is not connected to the external power supply.

13. The method of claim 12, comprising customising the first active noise reduction profile for optimising the active noise reduction output within a vehicle.

14. The method of claim 12, wherein the first active noise reduction profile is biased to a greater extent to the reduction of low frequency noise than the second active noise reduction profile.

* * * * *